United States Patent
Roberts (10) Patent No.: US 10,253,693 B2
(45) Date of Patent: Apr. 9, 2019

(54) THERMAL MANAGEMENT SYSTEM MANIFOLD

(71) Applicant: United Technologies Corporation, Farmington, CT (US)

(72) Inventor: Lawrence P. Roberts, North Palm Beach, FL (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 282 days.

(21) Appl. No.: 15/026,786

(22) PCT Filed: May 23, 2014

(86) PCT No.: PCT/US2014/039346
§ 371 (c)(1),
(2) Date: Apr. 1, 2016

(87) PCT Pub. No.: WO2015/053824
PCT Pub. Date: Apr. 16, 2015

(65) Prior Publication Data
US 2016/0222885 A1 Aug. 4, 2016

Related U.S. Application Data

(60) Provisional application No. 61/888,703, filed on Oct. 9, 2013.

(51) Int. Cl.
*F02C 7/14* (2006.01)
*F02C 7/224* (2006.01)
(Continued)

(52) U.S. Cl.
CPC ................ *F02C 7/14* (2013.01); *F01D 25/12* (2013.01); *F01D 25/18* (2013.01); *F02C 7/224* (2013.01);
(Continued)

(58) Field of Classification Search
CPC .... F02C 7/32; F02C 7/222; F02C 7/14; F02C 7/16; F02C 7/185; F02C 7/224;
(Continued)

(56) References Cited

U.S. PATENT DOCUMENTS 2,896,919 A 7/1959 Teague
4,151,710 A 5/1979 Griffin et al.
(Continued)

FOREIGN PATENT DOCUMENTS

EP 2541180 A1 1/2013
WO 2014159505 A1 10/2014
WO 2014200580 A1 12/2014

OTHER PUBLICATIONS

International Search Report for Application No. PCT/US2014/039346; dated Oct. 20, 2014.
Written Opinion for Application No. PCT/US2014/039346; dated Oct. 20, 2014.
European Search Report for Application No. EP 14 85 2169.

*Primary Examiner* — Andrew Nguyen
*Assistant Examiner* — Stephanie Cheng
(74) *Attorney, Agent, or Firm* — Cantor Colburn LLP (57) ABSTRACT

A single, unitary thermal management system (TMS) manifold for a gas turbine engine is provided which comprises one or more interfaces for mounting various thermal management system components directly to the TMS manifold. The TMS manifold also defines fluid passages for transferring fuel, engine lubricant or generator oil from one component to another component. Packing numerous fuel system and lubricating system components within the TMS manifold reduces cost and weight and simplifies maintenance.

9 Claims, 6 Drawing Sheets

(51) Int. Cl.
  *F01D 25/18* (2006.01)
  *F01D 25/12* (2006.01)
(52) U.S. Cl.
  CPC .. *F05D 2260/213* (2013.01); *F05D 2260/232* (2013.01); *F05D 2260/98* (2013.01); *Y02T 50/675* (2013.01)
(58) Field of Classification Search
  CPC .......... F01D 25/08; F01D 25/12; F01D 25/18; F05D 2260/20; F05D 2260/205; F05D 2260/213; F05D 2260/232; F23D 2021/0021; F23D 2021/0026; F23D 2021/004; F23D 2021/0049
  USPC ...................................... 60/736, 39.08, 39.83
  See application file for complete search history.

(56) References Cited

U.S. PATENT DOCUMENTS

| | | | |
|---|---|---|---|
| 4,759,401 A | 7/1988 | Pfouts et al. | |
| 5,090,740 A * | 2/1992 | Creager | F16L 41/03 285/125.1 |
| 6,189,313 B1 * | 2/2001 | Cass | F02C 7/224 60/734 |
| 8,261,527 B1 * | 9/2012 | Stearns | F02C 7/06 60/39.08 |
| 2008/0314573 A1 | 12/2008 | Schwarz et al. | |
| 2009/0252604 A1 | 10/2009 | Alexander et al. | |
| 2012/0107104 A1 * | 5/2012 | Suciu | F02C 7/14 415/177 |
| 2013/0086909 A1 | 4/2013 | Wang et al. | |

\* cited by examiner

THERMAL MANAGEMENT SYSTEM MANIFOLD

FIELD OF THE DISCLOSURE

The subject matter of the present disclosure relates generally to a thermal management system (TMS) manifold for a gas turbine engine in a jet aircraft. More particularly, the subject matter of the present disclosure relates to a TMS manifold in which various components of a fuel/engine oil cooler, a fuel/generator oil cooler and a generator oil/engine oil cooler are consolidated within a single, unitary thermal management system manifold.

BACKGROUND OF THE DISCLOSURE

In a typical gas turbine aircraft engine, a fan delivers air into a compressor section. Compressed air from the compressor section is delivered into a combustion section, mixed with fuel, and ignited. Products of this combustion pass downstream over turbine rotors which are driven to rotate. A low pressure turbine rotor drives a low pressure compressor and may drive the fan at the same rate of speed. Alternatively, a gear box may be included between the low pressure turbine rotor and the fan so that the fan and the low pressure compressor can rotate at different speeds.

The gas turbine engine includes a lubricating system for lubricating various engine parts such as the gear box. The lubricating system may include a fuel/engine oil cooler (ENG FOC) for cooling the lubricating oil (engine oil) with relatively cooler jet fuel. Fuel and oil conduits are in fluid communication with the fuel/engine oil cooler.

The lubricating system may also include a generator oil/engine oil cooler (IDG OOC) for cooling generator oil with relatively cooler engine oil. Conduits carrying the generator oil and engine oil run into and out of the generator oil/engine oil cooler.

The gas turbine engine may also include a fuel/generator oil cooler (IDG FOC) for cooling generator oil with relatively cooler jet fuel. Conduits carrying the fuel and generator oil run into and out of the fuel/generator oil cooler.

Finally, the gas turbine engine may also include a return-to-tank (RTT) valve that pulls fuel off the engine as needed and returns it to the fuel tank.

The present disclosure is directed to a TMS manifold for a jet aircraft in which various components of the gas turbine engine, such as various cooling components and the RTT valve, are condensed within the TMS manifold, thereby minimizing or eliminating separate mount systems for these components and their associated tubes and connections.

SUMMARY OF THE DISCLOSURE

The thermal management system (TMS) manifold of the present disclosure consolidates various engine components, including thermal management system components, into a single unitary structure.

According to an embodiment of the disclosure, a single, unitary TMS manifold is provided comprising a fuel/engine oil cooler interface for mounting a fuel/engine oil cooler directly to the thermal management system manifold and a fuel/generator oil cooler interface for mounting a fuel/generator oil cooler directly to the thermal management system manifold. The thermal management system manifold may define a passage (such as a conduit) for moving fuel from the fuel/generator oil cooler to the fuel/engine oil cooler.

The thermal management system manifold may further comprise a generator oil/engine oil cooler interface for mounting a generator oil/engine oil cooler directly to the thermal management system manifold. The thermal management system manifold may further define a passage for moving generator oil through the TMS manifold from the generator oil/engine oil cooler into the fuel/generator oil cooler.

The thermal management system manifold may further comprise a return-to-tank valve interface for mounting a return-to-tank valve directly to the thermal management system manifold. The thermal management system manifold may define a passage for carrying fuel into the return-to-tank valve.

The thermal management system manifold may define additional passages, such as:

a passage for moving generator oil from the fuel/generator oil cooler to a generator located outside of the TMS manifold;

a passage for moving fuel from a fuel boost pump to the fuel/generator oil cooler;

a passage for carrying fuel from the fuel/engine oil cooler out of the TMS manifold;

a passage for carrying engine oil into the fuel/engine oil cooler;

a passage for carrying engine oil from the fuel/engine oil cooler out of the TMS manifold;

a passage for carrying engine oil into the generator oil/engine oil cooler;

a passage for carrying engine oil from the generator oil/engine oil cooler out of the TMS manifold; and a passage for carrying generator oil from the generator to the generator oil/engine oil cooler.

The thermal management system manifold may be made of cast aluminum, and may be secured to the engine by brackets.

In another aspect the thermal management system manifold comprises a fuel/engine oil cooler interface for mounting a fuel/engine oil cooler directly to the thermal management system manifold and a generator oil/engine oil cooler interface for mounting a generator oil/engine oil cooler directly to the thermal management system manifold.

The thermal management system manifold may comprise any suitable combination of interfaces for mounting various thermal management system components and, optionally, an interface for a return-to-tank valve.

The thermal management system manifold may define any suitable combination of passages (conduits) in a single, unitray structure, including, for example:

a first passage for moving generator oil through the TMS manifold from the generator oil/engine oil cooler into the fuel/generator oil cooler where it can be cooled;

a second passage for moving the cooled generator oil from the fuel/generator oil cooler to a generator located outside of the TMS manifold;

a third passage for moving fuel from a fuel boost pump to the fuel/generator oil cooler to cool the generator oil;

a fourth passage for moving fuel from the fuel/generator oil cooler to the fuel/engine oil cooler where it can be used to cool engine oil;

a fifth passage for carrying fuel from the fuel/engine oil cooler out of the TMS manifold and to the combustion section;

a sixth passage for carrying engine oil into the fuel/engine oil cooler for cooling by the fuel;

a seventh passage for carrying the cooled engine oil from the fuel/engine oil cooler out of the TMS manifold;

an eighth passage for carrying engine oil into the TMS manifold and into the generator oil/engine oil cooler;

a ninth passage for carrying the engine oil from the generator oil/engine oil cooler out of the TMS manifold;

a tenth passage for carrying generator oil from the generator to the generator oil/engine oil cooler where it can be cooled by engine oil; an eleventh passage for carrying fuel into the return-to-tank valve; and a twelfth passage for carrying fuel from the return-to-tank valve out of the TMS manifold.

Although the different examples described herein may have the specific components shown in the illustrations, embodiments of this disclosure are not limited to those particular combinations of components. It is possible to use some of the components or features from one of the examples in combination with features or components from another one of the examples.

BRIEF DESCRIPTION OF THE DRAWINGS

So that the manner in which the concepts of the present disclosure recited herein may be understood in detail, a more detailed description is provided with reference to the embodiments illustrated in the accompanying drawings. It is to be noted, however, that the accompanying drawings illustrate only certain embodiments and are therefore not to be considered limiting of the scope of the disclosure, for the concepts of the present disclosure may admit to other equally effective embodiments. Moreover, the drawings are not necessarily to scale, emphasis generally being placed upon illustrating the principles of certain embodiments.

Thus, for further understanding of these concepts and embodiments, reference may be made to the following detailed description, read in connection with the drawings in which.

DETAILED DESCRIPTION

The present disclosure relates to a TMS manifold for a jet aircraft engine in which various engine components including thermal management system (cooling) components are condensed within the TMS manifold. Thus components that would normally be external to the TMS manifold, such as a fuel/engine oil cooler, fuel/generator oil cooler, generator oil/engine oil cooler and a return-to-tank valve, as well as various plumbing lines and fittings, are consolidated into a single TMS manifold. As a result, numerous separate mounts, housings and fluid conduits are eliminated.

Figure 1:
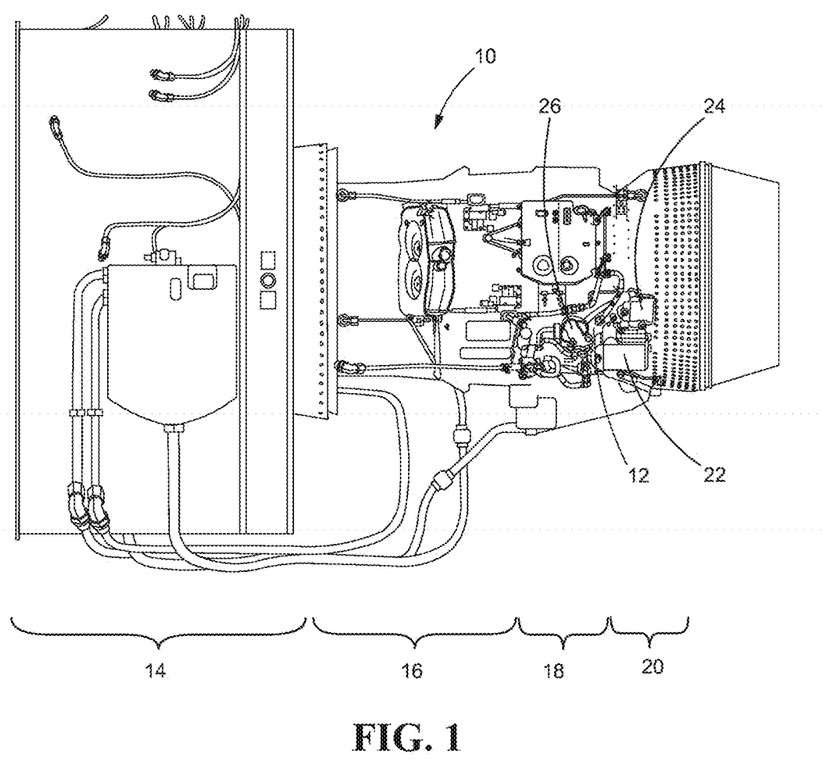
FIG. 1 is a left side view of a jet engine including a TMS manifold according to the present disclosure.

Turning to the figures, FIG. 1 is a left side view of a simplified jet engine 10 including a TMS manifold 12 according to the present disclosure. The jet engine 10 generally incorporates a fan section 14, a compressor section 16, a combustion section 18 and a turbine section 20. The fan section 14 drives air into the compressor section 16 while the compressor section drives air along a core flow path for compression and communication into the combustion section 18, then expansion through the turbine section 20. Although depicted as a turbofan gas turbine engine in the disclosed non-limiting embodiment, it should be understood that the concepts and structures described herein are not limited to use with turbofans as the teachings may be applied to other types of jet engines. The TMS manifold 12 shown in FIG. 1 is mounted on the left side of the engine 10 in a location close to and exterior of the combustion section 18, although any suitable location may be used.

Figure 2:
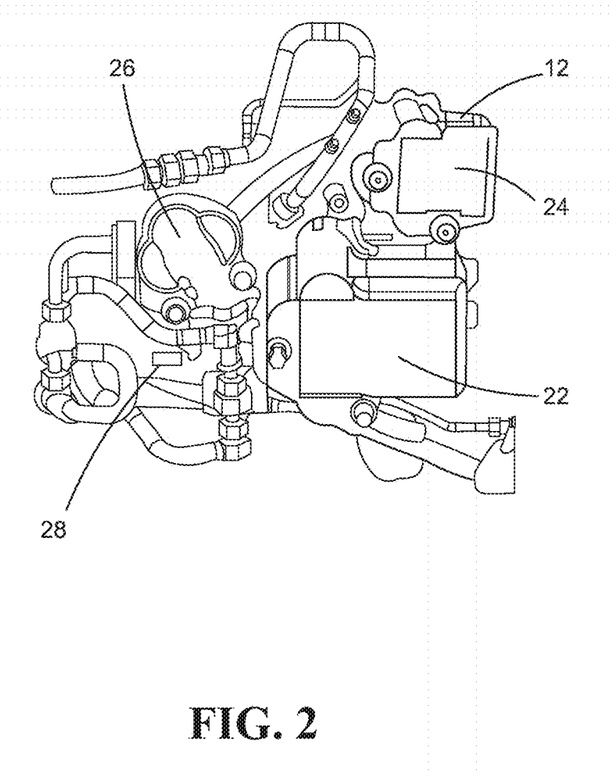
FIG. 2 is a left side view of the TMS manifold of FIG. 1 shown with various external engine components.

FIG. 2 is a close up side view of a portion of the jet engine 10 of FIG. 1 showing the TMS manifold 12 and other major engine components that interface with the TMS manifold 12. (The view is from the left side of the engine inward toward the engine center line. The left side of the engine is determined from the viewpoint of someone looking from the rear of the engine forward.) The engine 10 shown is heavily instrumented with temperature and pressure probes which accounts for some of the fittings shown in the figure.

The TMS manifold 12 incorporates into a single cast structure interfaces (mounts) for up to three heat exchangers (coolers) and a return-to-tank valve (RTT valve). For example, the TMS manifold 12 of FIG. 2 comprises interfaces for a fuel/engine oil cooler (ENG FOC) 22, a fuel/generator oil cooler (IDG FOC) 24, a generator oil/engine oil cooler (IDG OOC) 26, and a RTT valve 28.

The fuel/engine oil cooler 22 cools the engine oil using jet fuel. The fuel/engine oil cooler 22 is mounted to the TMS manifold 12 in a manner that enables easier access to the fuel/engine oil cooler 22 for installation and maintenance. The fuel/generator oil cooler 24 cools the generator oil using jet fuel. The generator oil/engine oil cooler 26 cools the generator oil using the engine oil. The RTT valve 28 pulls fuel off the engine as needed and returns it to the fuel tank.

The generator may be an integrated drive generator, or IDG, or any other suitable electrical generator. The IDG supplies constant frequency AC electrical power to an aircraft by incorporating a constant speed generator and an oil cooler in the same housing.

Figure 3:
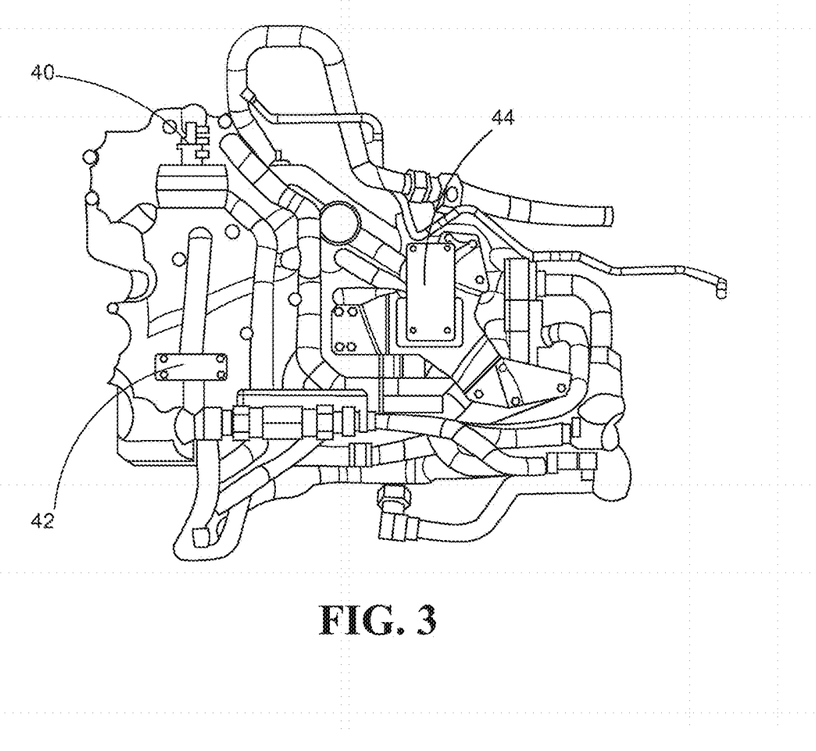
FIG. 3 is a right side view of the TMS manifold of FIG. 2 shown with various external engine components.

FIG. 3 is a right side view of the TMS manifold 12 of FIG. 2, viewed approximately from the engine center line outward. The TMS manifold 12 may be secured to the engine case by various brackets, including a first aft bracket 40 located on the inboard side of the TMS manifold 12 opposite the IDG FOC interface 34, and a second aft bracket 42 located on the inboard side of the TMS manifold 12 substantially opposite the ENG FOC interface 32. A third bracket 44 is also located on the inboard side of the TMS manifold 12 substantially behind the generator oil/engine oil cooler 26.

Figure 4:
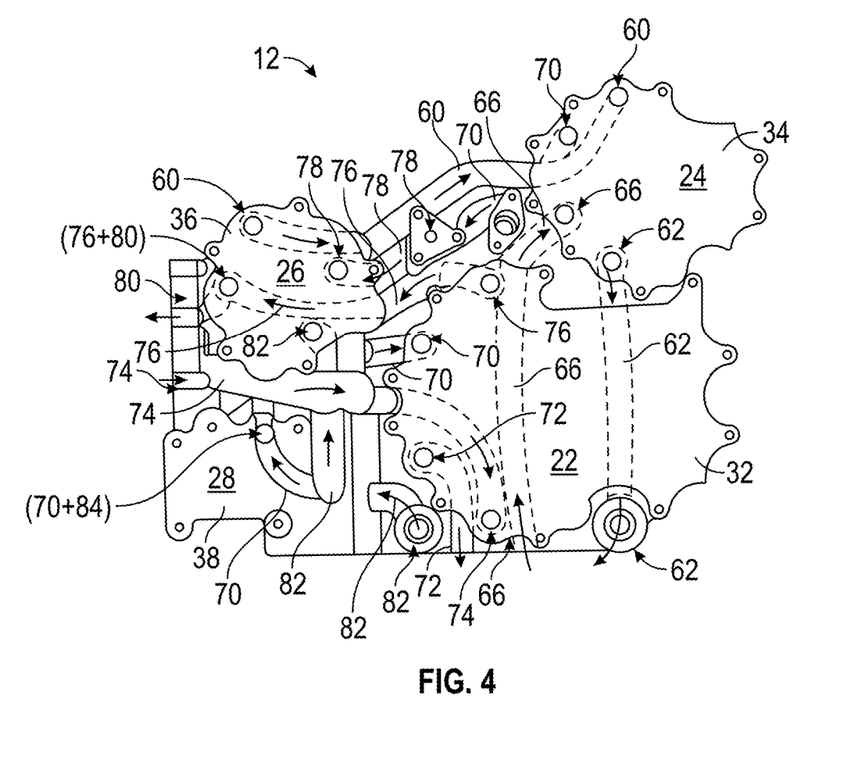
FIG. 4 is a left side view of the TMS manifold of FIG. 2 with the external engine components removed.

FIG. 4 is a left side view of the TMS manifold of FIG. 2 with the external engine components (heat exchangers, RTT valve etc.) removed for clarity. A fuel/engine oil cooler interface 32 serves as component mount for the fuel/engine oil cooler 22 shown in FIG. 2. A fuel/generator oil cooler interface 34 serves as component mount for the fuel/generator oil cooler 24 shown in FIG. 2. A generator oil/engine oil cooler interface 36 serves as component mount for the generator oil/engine oil cooler 26 shown in FIG. 2. An RTT valve interface 38 serves as component mount for the RTT valve 28 shown in FIG. 2. This view makes it clear that the fuel/engine oil cooler 22 and the fuel/generator oil cooler 24 are mounted flush against the TMS manifold 12—with a space seal therebetween—rather than having piping connecting the heat exchangers 22, 24 to a manifold where the piping, or the heat exchangers 22, 24—is plumbed to the manifold via a three boot flange or other connection. Fastening means such as bolts may be used to secure the various engine external components to the TMS manifold interfaces.

The TMS manifold 12 makes it possible to condense various engine components within the TMS manifold 12. For example, integration of the fuel/engine oil cooler interface 32 into the single cast TMS manifold 12 eliminates the need for separate mounting hardware for the fuel/engine oil cooler 22. Integration of the fuel/generator oil cooler interface 34 into the single cast TMS manifold 12 eliminates the need for separate mounting hardware for the fuel/generator oil cooler 24. Integration of the generator oil/engine oil cooler interface 36 into the TMS manifold 12 eliminates the need for separate mounting hardware for generator oil/engine oil cooler 26. And integration of the return-to-tank valve interface 38 into the TMS manifold 12 eliminates the need for separate mounting hardware for the RTT valve 28.

Figure 5:
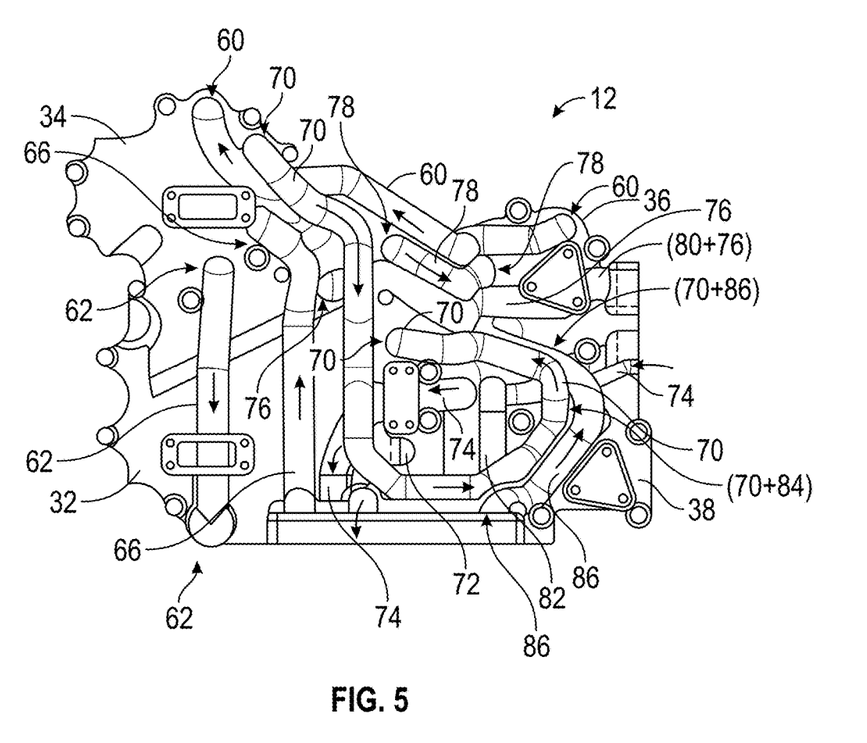
FIG. 5 is a right side view of the TMS manifold of FIG. 3 with the external engine components removed.

FIG. 5 is a right side view of the TMS manifold 12 of FIG. 3 with the external engine components removed. As is apparent from FIGS. 4 and 5, the TMS manifold 12 may also comprise various fuel and lube plumbing interfaces for accommodating fuel or lube lines as will now be explained. The TMS manifold 12 defines fluid passages for transferring three types of fluids: fuel, lubricant (engine oil) and generator oil, from one component to another component, thereby eliminating fluid lines that previously were external to the TMS manifold 12. Thus clusters of piping and tubes adjacent the TMS manifold 12 are replaced with cast core portions integral with the TMS manifold 12 that define various fuel and lubricant flow passages. This new design results in simpler plumbing routing in the vicinity of the TMS manifold 12 compared to conventional thermal management systems that incorporate external plumbing lines.

Figure 6:
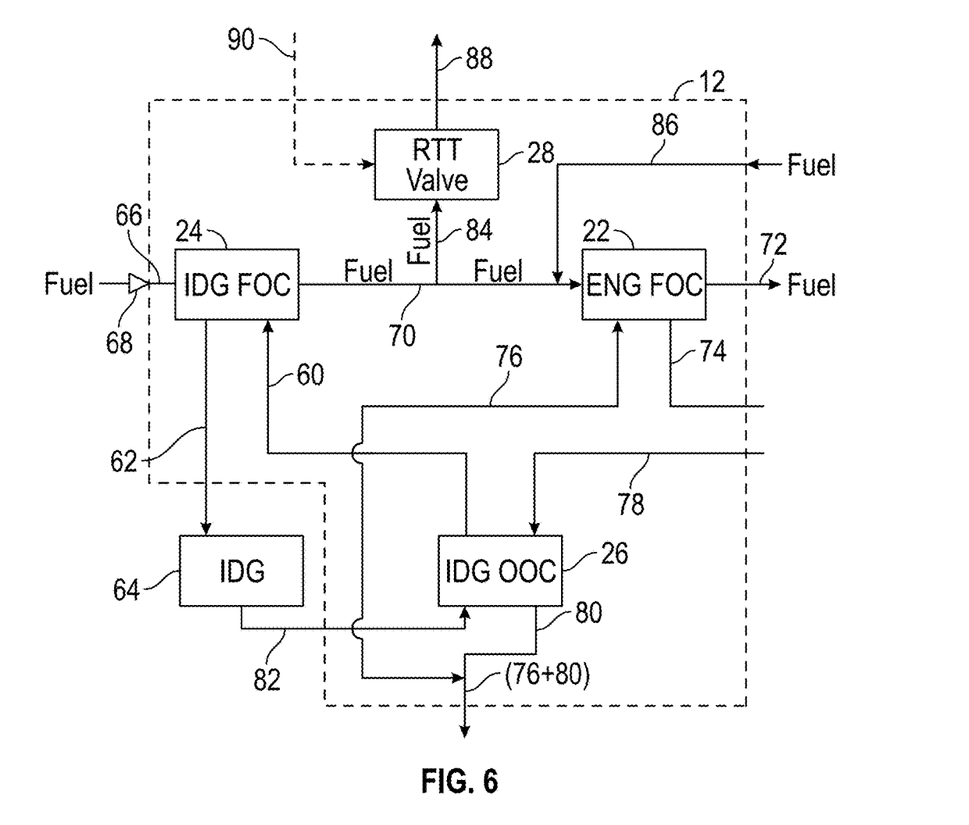
FIG. 6 is a schematic diagram of a thermal management system manifold according to the present disclosure.

For example, the TMS manifold 12 may define the following passages (Arrows have been added to FIGS. 4 and 5 in some instances to indicate the direction of fluid flow):

a first passage 60 for moving generator oil through the TMS manifold 12 from the generator oil/engine oil cooler 26 into the fuel/generator oil cooler 24 where it can be cooled;

a second passage 62 for moving the cooled generator oil from the fuel/generator oil cooler 22 to a generator 64 located outside of the TMS manifold 12;

a third passage 66 for moving fuel from a fuel boost pump 68 to the fuel/generator oil cooler 24 to cool the generator oil;

a fourth passage 70 for moving fuel from the fuel/generator oil cooler 24 to the fuel/engine oil cooler 22 where it can be used to cool engine oil;

a fifth passage 72 for carrying fuel from the fuel/engine oil cooler 22 out of the TMS manifold 12 and to the combustion section 18;

a sixth passage 74 for carrying engine oil into the fuel/engine oil cooler 22 for cooling by the fuel;

a seventh passage 76 for carrying the cooled engine oil from the fuel/engine oil cooler 22 out of the TMS manifold 12;

an eighth passage 78 for carrying engine oil into the TMS manifold 12 and into the generator oil/engine oil cooler 26;

a ninth passage 80 for carrying the engine oil from the generator oil/engine oil cooler 26 out of the TMS manifold 12;

a tenth passage 82 for carrying generator oil from the generator 64 to the generator oil/engine oil cooler 26 where it can be cooled by engine oil;

an eleventh passage 84 for carrying fuel into the RTT valve 28; and a twelfth passage 86 for carrying additional fuel from a bypass to the fuel/engine oil cooler 22. FIG. 6 is a schematic diagram of a thermal management system manifold 12 according to the present disclosure. Solid lines within the TMS manifold boundary or intersecting the TMS manifold 12 boundary represent internal passages within the TMS manifold 12 and defined by the TMS manifold 12 as described above with respect to FIGS. 4 and 5. A conduit 88 running from the RTT valve 28 allows fuel to be returned to the fuel tank. A conduit 90 carries fluid for actuating the RTT valve 28.

The TMS manifold 12 is designed to meet certain functional requirements set forth in the schematic of FIG. 6. For example, fuel is pumped from a fuel tank (not shown) through a fuel boost pump 68 and then through a third passage 66 to the fuel/generator oil cooler 24 and then to the fuel/engine oil cooler 22 before exiting the TMS manifold 12 via the fifth passage 72 on its way to the combustion section 18.

Generator oil flows into generator 64 and exits via the tenth passage 82. The generator oil then enters the TMS manifold 12 and passes through the generator oil/engine oil cooler 26 where it is cooled by engine oil. The cooled generator oil then flows through first passage 60 to the fuel/generator oil cooler 24 where it is further cooled by fuel. Upon exiting the fuel/generator oil cooler 24 the generator oil flows out of the TMS manifold 12 and back through the generator 64.

Engine oil flows into the TMS manifold via sixth passage 74 and into the fuel/engine oil cooler 22 where it is cooled by fuel. After being cooled the engine oil flows through integral passage 76 before exiting the TMS manifold 12 via ninth passage 80. Engine oil also flows into the TMS manifold 12 through eighth passage 78, then into the generator oil/engine oil cooler 26 where it cools the generator oil. The engine oil flows out of the generator oil/engine oil cooler 26 and exits the TMS manifold 12 via passage 80.

The TMS manifold 12 may be manufactured from aluminum using a sand casting process and subsequent machining of the cast piece. The casting approach minimizes machining and reduces casting mass. Only the interfaces, port holes and tapped holes require machining; the remainder of the TMS manifold surface remains "as cast."

BENEFITS/INDUSTRIAL APPLICABILITY

The TMS manifold 12 of the present disclosure consolidates thermal management system (cooling) components and other engine components into a single unitary structure, i.e., a structure made of a single piece of material. The TMS manifold 12 of the present disclosure is expected to provide the following benefits:

1. The TMS manifold 12 acts as a mount for various engine components, thereby eliminating separate mounts elsewhere in the engine. This results in simpler positioning of the thermal management system components relative to each other.

2. The TMS manifold 12 defines various fluid passages for various engine fluids, thereby eliminating certain fluid lines that had been external to the TMS manifold. For example, a cluster of tubes adjacent the TMS manifold is replaced with integrally cast conduits that defines various fuel and lubricant flow (core) passages. This results in simpler plumbing routing in the vicinity of the TMS manifold 12 compared to conventional systems that incorporate rigid plumbing lines exterior to the TMS manifold.

3. The TMS manifold 12 results in easier maintenance of the thermal management system components. For example, the TMS manifold 12 provides improved accessibility to the fuel/engine oil cooler 22 which mounts directly to the TMS manifold 12.

4. The TMS manifold 12 results in weight savings.
5. The TMS manifold 12 results in cost savings.
6. The TMS manifold results in a reduced part count.
7. Improved engine aesthetics.

While the present disclosure has been shown and described in terms of one or more exemplary embodiments, it will be understood by one skilled in the art that various changes in detail may be effected therein without departing from the spirit and scope of the disclosure as defined by claims that may be supported by the written description and drawings. Further, where these exemplary embodiments (and other related derivations) are described with reference to a certain number of elements it will be understood that other exemplary embodiments may be practiced utilizing either less than or more than the certain number of elements.

The invention claimed is:

1. A system for a gas turbine engine, comprising:
    an engine case,
    a manifold secured to the gas turbine engine, the manifold being a single, unitary thermal management system manifold, the manifold including,
    a top side including a plurality of bracket mounts for securing the manifold to the engine case, wherein when secured to the engine case, the top side of the manifold faces the engine case,
    a bottom side, wherein when secured to the engine case, the bottom side of the manifold faces away from the engine case,
    the bottom side including a plurality of mating platforms, wherein in a plan view of the bottom side, the plurality of mating platforms include: a first mating platform proximate a top-right position, a second mating platform proximate a bottom-right position, a third mating platform proximate a bottom-left position, and a fourth mating platform proximate a top-left position,
    the plurality of mating platforms securing a respective plurality of implements to the manifold, including the first mating platform securing a fuel/generator oil cooler to the manifold, the second mating platform securing a fuel/engine oil cooler to the manifold, the third mating platform securing a return-to-tank (RTT) valve to the manifold, and the fourth mating platform securing a generator oil/engine oil cooler to the manifold,
    each of the plurality of mating platforms including a plurality of securing orifices for securing the respective plurality of implements thereto, and each of the plurality of mating platforms including a plurality of plumbing orifices fluidly connected to the respective plurality of implements that direct fluid into and/or out of a respective plurality of passages in the manifold, whereby the first mating platform is a fuel/generator oil cooler interface, the second mating platform is a fuel/engine oil cooler interface, the third mating platform is a return-to-tank (RTT) valve interface, and the fourth mating platform is a generator oil/engine oil cooler interface,
    wherein the plurality of securing orifices and plurality of plumbing orifices each extend in a first direction toward the engine case and segments of the plurality of passages each extend proximate to the engine case and transverse to the first direction, whereby the plurality of implements is disposed proximate the engine case with the plurality of passages there-between,
    wherein the plurality of passages includes a first plurality of fluid passages for delivering fluid between the plurality of mating platforms, including:
    a first passage fluidly connecting the generator oil/engine oil cooler interface and the fuel/generator oil cooler interface,
    a second passage fluidly connecting the fuel/generator oil cooler interface and the fuel/engine oil cooler interface, and
    a third passage fluidly connecting the return-to-tank valve interface and the second passage.

2. The system of claim 1, wherein the plurality of passages includes a second plurality of fluid passages fluidly connected to the plurality of interfaces for carrying fluid out of the manifold, including:
    a fourth passage fluidly connected to the fuel generator oil cooler interface for carrying cooled generator oil from the fuel/generator oil cooler to a generator located outside of the manifold,
    a fifth passage fluidly connected to the fuel/engine oil cooler interface for carrying fuel from the fuel/engine oil cooler out of the manifold, and
    a sixth passage fluidly connected to the generator oil/engine oil cooler interface for carrying engine oil from the generator oil/engine oil cooler out of the manifold, and
    wherein the plurality of passages further includes:
    a seventh passage fluidly connected to the fuel/engine oil cooler interface for carrying the cooled engine oil from the fuel/engine oil cooler to the sixth passage.

3. The system of claim 2, wherein the plurality of passages includes a third plurality of fluid passages fluidly connected to the plurality of interfaces for carrying fluid into the manifold, including:
    an eighth passage fluidly connected to the fuel/generator oil cooler interface for carrying fuel from a fuel boost pump to the fuel/generator oil cooler to cool the generator oil,
    a ninth passage fluidly connected to the fuel/engine oil cooler interface for carrying engine oil into the fuel/engine oil cooler,
    a tenth passage fluidly connected to the generator oil/engine oil cooler interface for carrying engine oil into the generator oil/engine oil cooler, and
    an eleventh passage fluidly connected to the generator oil/engine oil cooler interface for carrying generator oil from a generator located outside of the manifold to the generator oil/engine oil cooler, and
    wherein the plurality of passages further includes:
    a twelfth passage fluidly connected to the second passage for carrying fuel to the fuel/engine oil cooler.

4. The system of claim 3, wherein the manifold comprises:
    a first RTT passage fluidly connected to the return-to-tank (RTT) valve for carrying fuel from the return-to-tank (RTT) valve to the fuel tank, and
    a second RTT passage fluidly connected to the return-to-tank (RTT) valve for carrying fluid to the return-to-tank (RTT) valve for actuating the return-to-tank (RTT) valve.

5. The system of claim 1, wherein the fuel/engine oil cooler and fuel/generator oil cooler are mounted flush against the manifold, with a face seal therebetween.

6. The system of claim 1 wherein:
    the manifold is made of cast aluminum.

7. The system of claim 1, wherein the manifold is secured to the engine case by brackets.

8. The system of claim 1 wherein the generator is an integrated drive generator.

9. A gas turbine engine comprising the system of claim 1.

\* \* \* \* \*